Figure 3:
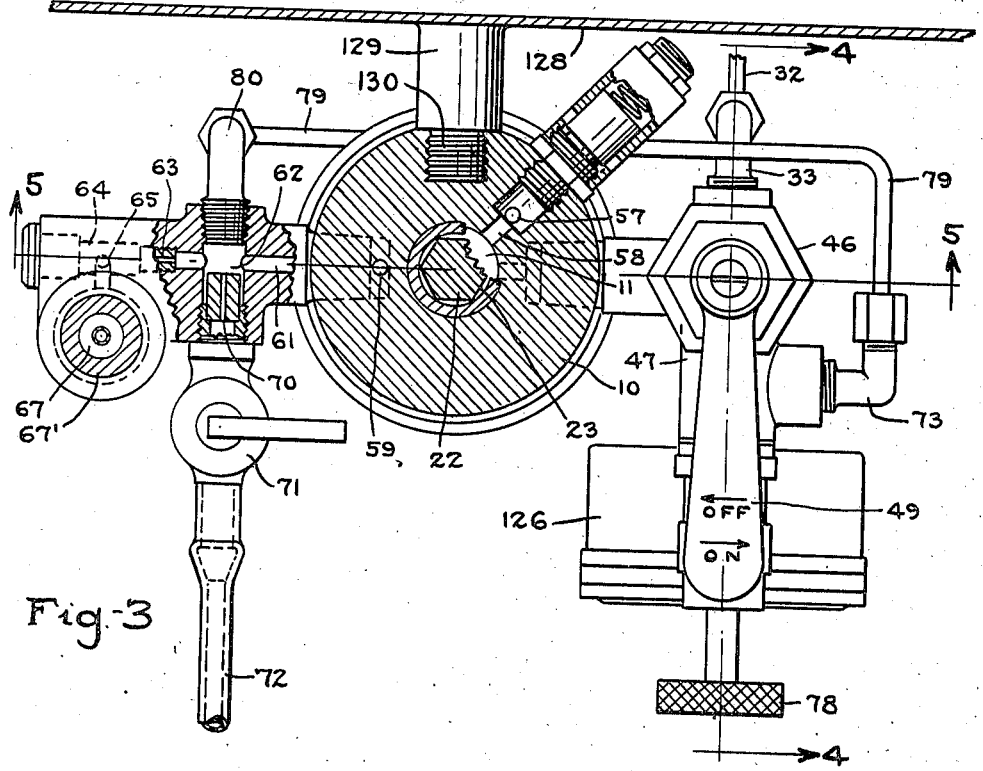

Nov. 5, 1940.  J. A. HEIDBRINK  2,220,368
MEANS FOR REGULATING DELIVERY OF GAS
Filed May 21, 1938  3 Sheets-Sheet 1
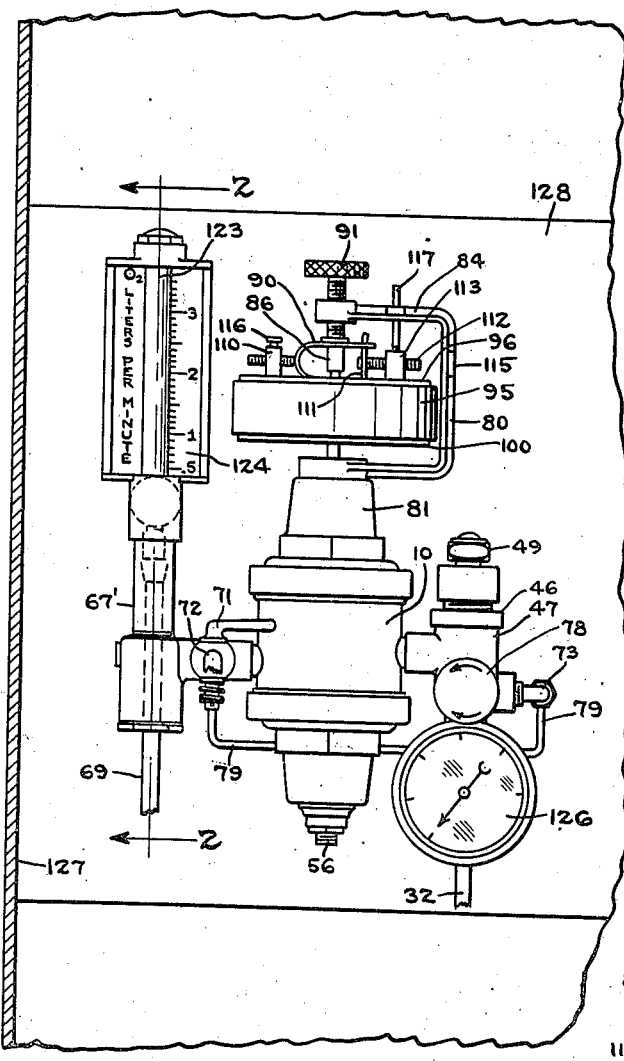
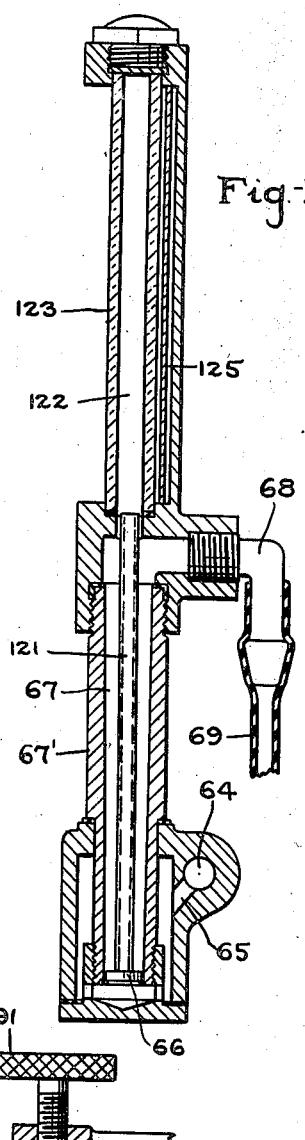
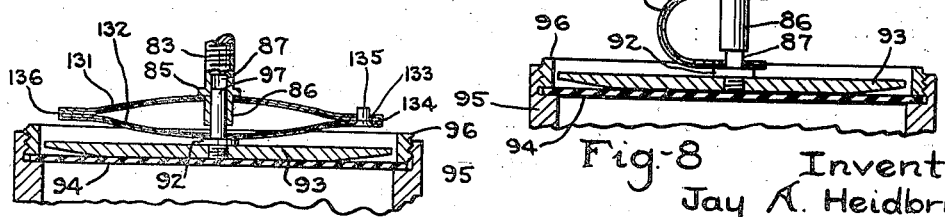
Inventor:
Jay A. Heidbrink.
By Whiteley and Ruckman
Attorneys.

Nov. 5, 1940.        J. A. HEIDBRINK        2,220,368
MEANS FOR REGULATING DELIVERY OF GAS
Filed May 21, 1938        3 Sheets-Sheet 2

Inventor:
Jay A. Heidbrink.
By Whiteley and Ruckman
Attorneys.

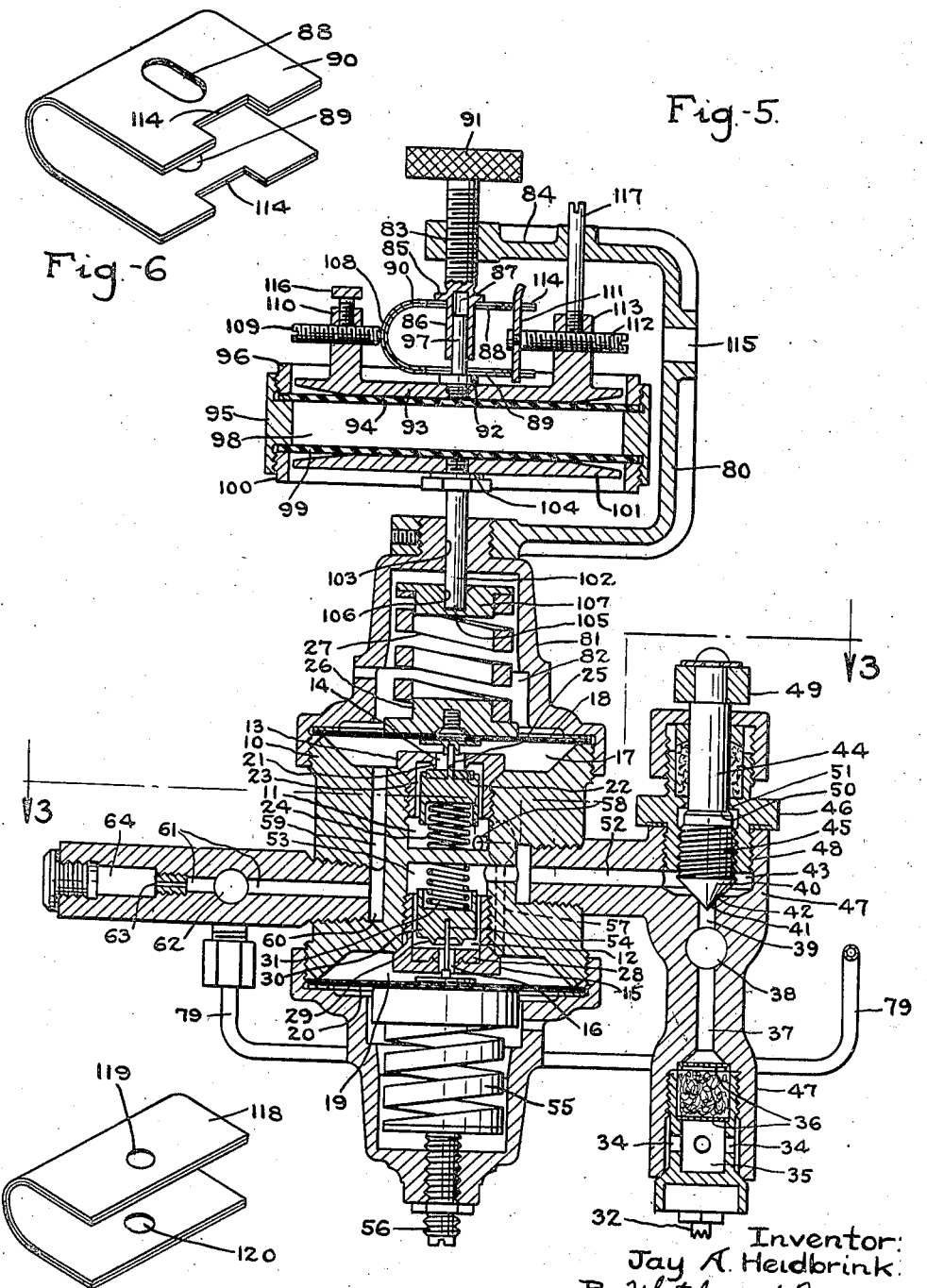

Patented Nov. 5, 1940

2,220,368

UNITED STATES PATENT OFFICE 2,220,368

MEANS FOR REGULATING DELIVERY OF GAS

Jay A. Heidbrink, Minneapolis, Minn., assignor, by mesne assignments, to Air Reduction Company, Incorporated, a corporation of New York Application May 21, 1938, Serial No. 209,296

8 Claims. (Cl. 137—153)

My invention relates to means for regulating delivery of gas in varying external pressures at varying temperatures, and has for its primary object to supply to individual persons in an attenuated atmosphere, such, for example, as experienced in airplane travel at high altitudes or in ascending high mountains, air enriched by additions of oxygen suitably proportioned for the altitude reached or the degree of attenuation of the atmosphere.

This application is an improvement on my copending application Serial Number 175,847, and it is a particular object of this invention to provide, in connection with control means automatically-actuated to increase the flow of oxygen as external air pressure diminishes, a means to compensate for changes in rate of operation of a pressurestat employed for the purpose due to changes in temperature to which said pressurestat is subjected.

It is a further object of my invention to provide means such that an operator can regulate manually, through the temperature-compensating device, the rate of flow of oxygen in atmospheres of varying densities.

It is a particular object of my invention to provide regulator means operated by a hand nut for increasing or decreasing flow of oxygen gas from a source of supply which shall include a pressurestat for automatically varying said rate of flow according to the degree of pressure exerted by the atmosphere in combination with thermostatic means which will operate to compensate for operative variations of the pressurestat due to variations in temperature.

It is a further object of my invention to provide such thermostatic means of a bimetallic thermostatic member wherein the part of the member having the greatest coefficient of expansion shall be so related to the assemblage that as temperature rises the pressure exerted by the adjusting means through the thermostatic member will decrease, and as temperature falls that pressure will increase, thus compensating for the increased and decreased pressure of the gas within the pressurestat member due to increase or decrease of its temperature.

It is a further object of my invention to provide a thermostatic member with means for adjusting it lengthwise so as to increase or decrease its effective thrust for compensating adjustment of the pressurestat.

The full objects and advantages of my invention will appear in connection with the detailed description thereof, and its novel features are pointed out in the appended claims.

Figure 4:
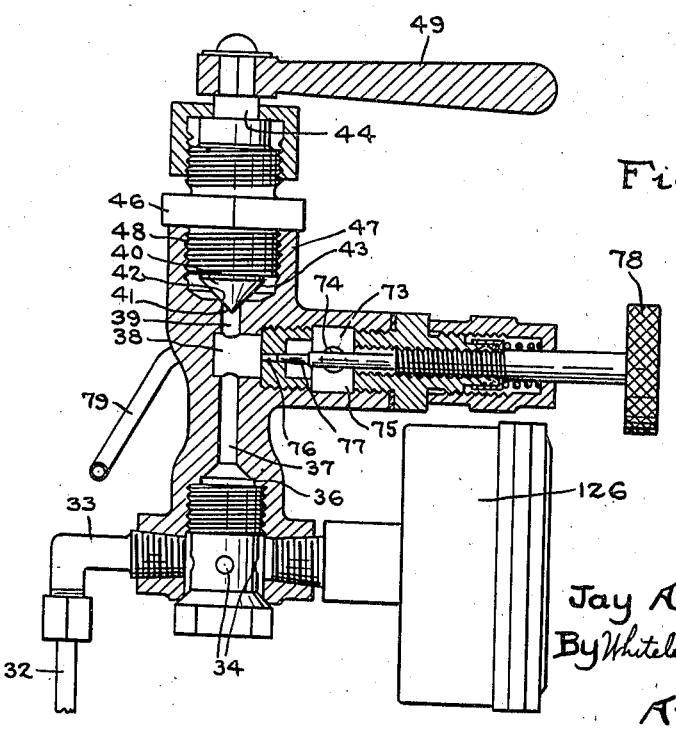

In the drawings, illustrating an application of my invention in one form:

Fig. 1 illustrates the assemblage of oxygen-control devices as it will appear, for example, within a cabin of an airplane. Fig. 2 is a sectional view taken on line 2—2 of Fig. 1. Fig. 3 is a plan view of the device shown in Fig. 1 taken on line 3—3 of Fig. 5. Fig. 4 is a sectional elevation view on line 4—4 of Fig. 3. Fig. 5 is a sectional elevation view taken on line 5—5 of Fig. 3. Fig. 6 is a sectional perspective view of a preferred form of a thermostatic compensating member. Fig. 7 is a perspective view of a variant form of compensating member. Fig. 8 is a sectional view corresponding in part to what is shown in the upper portion of Fig. 5 showing use of the thermostatic member illustrated in Fig. 7. Fig. 9 shows another form of thermostatic metal in the position of the thermostat 90 of Fig. 5 with related parts.

Referring particularly to Figs. 1 and 5, a casing member 10 is provided with upper and lower valve chambers 11 and 12. Valve chamber 11 is closed by a tubular threaded member 13 except for an orifice 14 at the upper center thereof. In like manner valve chamber 12 is closed by a threaded tubular member 15 except for a centrally-disposed orifice 16. Above valve chamber 11 is an expanded chamber 17 having its top closed by a diaphragm 18. Below valve chamber 12 is an expanded chamber 19 having its bottom closed by a diaphragm 20. A valve seat 21 is formed about the central opening 14 from valve chamber 11. The inner wall of valve chamber 11 is cylindrical, and within it moves a valve head 22 which may be spaced around its edges from the inner wall of valve chamber 11 as indicated at 23. A coil spring 24 tends to force the plunger 22 against the valve seat 21. The diaphragm 18 is provided with a thrust pin 25 and has resting upon the diaphragm a head 26 which is engaged by a strong compression spring 27. The spring 27 tends to move the diaphragm 18 and the pin 25 downwardly and the pin in turn is secured to and adapted to move the valve member 22 away from the valve seat 21 so as to permit gas to flow past it through opening 14 into chamber 17. The valve chamber 12 has toward its bottom a valve block 28, which is adapted to be engaged by valve seat 29 on a hexagonal valve head 30 in chamber 12. A compression spring 31 tends to move the valve head 30 so as to cause the valve seat 29 thereon to engage the valve block 28 and close communication between valve chamber 12 and expanded chamber 19.

Oxygen or other gas is supplied from any suitable source of supply under pressure through a tube 32, Fig. 4, which conducts the gas by means of a union 33 and ports 34 to a chamber 35, Fig. 5. From the chamber 35 the gas passes through a suitable screening device indicated at 36, Fig. 5, and into a passageway 37. As clearly shown in Figs. 4 and 5, the passage 37 communicates with a chamber 38. The chamber 38 is provided with a passageway 39 which is controlled by a double-acting valve member 40. This member 40 has a conical end 41 adapted to engage a valve seat 42 around the margin of passageway 39 which opens into a chamber 43. The valve member 40 is provided with a shank 44 which is threaded as indicated at 45 into the interior of a hollow closure nut 46 threaded into casing member 47 as shown at 48 in Figs. 4 and 5. The shank 44 has thereon an operating handle 49 by means of which the valve assemblage can be turned, which has the effect of causing the conical face 41 to engage or move from the valve face 42. The shank 44 is provided with a second valve face 50 adapted to engage valve seat 51 on a portion of nut 46. The structure of this device is such that in operation the handle 49 is moved to the end of one or another of its operative positions, one position, as in Fig. 5, resulting in closing off all gas flow from passageway 39 to chamber 43 and the other movement operating simultaneously to open these passages to each other and to seal the device against gas leakage through contact of valve face 50 and valve seat 51.

Gas passes from the chamber 43 through a passageway 52 into a portion 53 of valve chamber 12 above the hexagonal valve head 30, from where it may pass along the faces of the valve head 30 to the lower portion of valve chamber 12. The diaphragm 20 is provided with a pusher pin 54 which engages valve head 30 with a predetermined pressure from a powerful spring 55 adjustable by means of a setscrew 56. On the other hand, the pressure of gas from diaphragm 20 operates to move the valve head 30 in the opposite direction to cause engagement of the valve edge 29 with the face of the valve block 28. When, therefore, the pressure of spring 55 is sufficient to overcome the reverse pressure of gas upon diaphragm 20 the valve head 30 will be moved to separate the valve members and permit gas to flow through passageway 16 into chamber 19. From chamber 19 gas may flow into valve chamber 11 through a pipe indicated in dotted lines at 57 and having its orifice into chamber 11 at 58, Fig. 5. When valve head 22 is held away from valve seat 21 by means of compression spring 27, gas may flow into chamber 17, from where it goes through passageways 59, 60 and 61 to a chamber 62. From chamber 62 the gas may pass through a bore 63 to passageways 64, 65, Fig. 2, beneath the piston 66 in expanding passageway 67 within tube 67' to discharge pipe 68 from which the gas goes through a tubing 69 to the person or persons who, as shown in my aforesaid application, are provided with a suitable mask or masks for receiving the gas. In some cases the gas may go direct from chamber 62 through bore 70, Fig. 3, past a stop valve 71 to delivery tube 72, which may lead to another person or persons, as, for example, an assistant pilot.

In some instances it may be desirable to deliver the gas without passing it through the regulator, as when, for some reason, the regulator becomes ineffective. To accomplish this a pipe 73 opens through an orifice 74, Fig. 4, into a chamber 75. This chamber connects by means of a needle valve seat 76 with the chamber 38 which is connected with the gas supply line. A needle valve 77 operated by a thumb screw 78 controls flow of gas to pipe 73. Pipe 73 in turn is connected by means of a delivery pipe 79 with a pipe connection 80, which delivers the gas into chamber 62. In this manner the gas is by-passed around the regulator including the valve chamber 11, as clearly shown in Fig. 3.

Control of spring 27 and through it of delivery of gas through the regulating valve is automatically effected with suitable adjustments for differences in both pressure and temperature by means which will now be described. These means are shown in plan elevation in Fig. 1, and in enlarged plan section in Fig. 5. A yoke member 80 is rigidly secured to cap member 81 fast on casing 10 and providing chamber 82 for housing the spring 27. Threaded through a bearing 83 in the upper yoke arm 84 of member 80 is a thumb nut 91 which has a flange 85, a shank 86 and a hollow bore 87 within said shank. The shank 86 is adapted to extend through elongated apertures 88, 89 in a U-shaped member 90 which is formed of bimetallic thermostatic metal of well-known construction. The metal of greater expansibility will be on the outside of member 90, so that as temperature rises the arms of the U-member will be caused to approach each other and as the temperature falls said arms will be caused to spread apart. The member 90 rests upon a flange collar 92 threaded into and secured to a wide follower 93 which in turn rests upon a diaphragm member 94 secured to a floating ring 95 by means of a threaded ring 96, as clearly shown in Fig. 5. The member 92 is provided with a pin 97 which is adapted to move in the center bore 87 within shank 86 whereby the thrust of threaded thumbscrew 91 through flange 85 will be transmitted to and through U-shaped thermostatic member 90 to follower 93 and thence to diaphragm 94.

Spaced from diaphragm 94, as indicated at 98, in Fig. 5, is a second diaphragm 99 which is held within ring 95 by threaded ring 100, and which diaphragm 99 in turn engages a follower 101. Threaded into the follower 101 is a stem 102 which takes through a guide aperture 103 at the center of the top of cap 81. The stem 102 is provided with a shouldered collar 104 upon which rests the follower 101 and the end 105 of stem 102 rests in a socket 106 formed in a cap member 107 which engages and follows spring 27. The space 98 between diaphragms 94 and 99 is filled with a suitable gas expansible both to changes in temperature of the gas and external pressure exerted upon the gas through diaphragms 94 and 99. It follows that as external or atmospheric pressure decreases the gas within chamber 98 will expand and tend to push diaphragms 94 and 99 further apart. Since movement in one direction is prevented by thumbscrew 91 and connecting parts the sum of the spreading movement will be transmitted through stem 102 and cap 107 to spring 27, with the result that decrease of external pressure will increase pressure upon the spring and correspondingly increase flow of gas (oxygen or whatever gas may be desired) from the regulator valve to the inhaler tube 69. In this connection it will be understood that the thermostatic U-member 90 will be made of metal of such strength and stiffness as to resist any effect of moving the arms of said U-member relative to each other due to the thrust of spring 27 against thermostatic U-piece.

But if temperature rises the gas within chamber 98 will be caused to expand, and, in the same manner as is true of the expansion and reduction of external pressure, this will tend to thrust spring 27 against regulator diaphragm 18 and increase flow of gas to the distributor or inhaler tube 69, which may be, and usually is, undesirable. However, increase in temperature will cause the arms of thermostatic U-member 90 to approach each other, thus compensating for expansion in chamber 98 and maintaining flow of gas from the regulator constant through varying degrees of temperature.

To adjust for extreme delicacy and accuracy of operation, the thermostatic U-member 90 has the center of its curved head at 108 engaged by a screw member 109 which is threaded through an ear 110 on follower 93. Similarly a plate follower 111 has swiveled connection with a screw member 112 which is threaded in an ear 113 on follower 93, in line with the same but on the opposite side from the center of the follower, as clearly shown in Fig. 5. The plate follower 111 takes in guide apertures 114 in thermostatic member 90. Screw member 112 will be operated through an aperture 115 in yoke member 80. By operating screws 109 and 112 it will be evident that the thermostatic U-member 90 can be moved longitudinally, the slots 88 and 89 permitting said movement, whereby the action of member 90 from changes of temperature will result in a greater or less amount of throw, according as the fulcrum point is further from or nearer to the head 108 thereof. A setscrew 116 holds adjusting screw 109 in fixed position, and a setscrew 117 holds adjusting screw 112 in position.

Another form of thermostatic member which will effect the same results as the member 90 is shown in Fig. 9. In this form two slightly bowed thermostatic members 131, 132 are provided, formed of bimetallic thermostatic metal with the metal of greater coefficient of expansion on adjacent sides. The member 131 is provided with an aperture 133 at one end through a flattened portion 134, and the member 132 is provided with a peg 135 which extends through the aperture 133. The two members 131 and 132 are thus held locked against relative movement at one end. The other ends of these members have flattened portions contacting, as indicated at 136. It follows that as temperature rises the members 131 and 132 will tend to straighten and thus their adjacent faces draw closer together. As temperature falls the members 131 and 132 will tend to bow more and thus their adjacent faces be spread farther apart.

As shown in Fig. 9, the thermostatic member just described is positioned in the place of member 90 in Fig. 5 except that there is provided no endwise adjustment. An aperture in thermostatic member 131 receives the shank 86 of thumbscrew member 83 and the flange 85 thereof rests upon the top of member 131. In like manner the outside of member 132 rests upon flange 92 and pin 97 passes through an aperture in member 132 and into bore 87 within shank 86. When so assembled it will be obvious that the thermostatic member 131, 132, with the metal of greater expansibility on the adjacent sides thereof operates in the same manner as thermostat member 90, whereby when increase in temperature in chamber 98 of the pressurestat tends to spread the diaphragms apart and increase pressure on spring 27, the thermostatic member 131, 132 will have the supporting portions thereof brought closer together and compensate for this change of pressure in the pressurestat to maintain the action upon spring 27 and the regulator 5 constant throughout such changes of temperature.

A variant form of the thermostatic U-member 90 is indicated at 118 in Figs. 7 and 8. In this form, as clearly shown in Fig. 7, round apertures 119 and 120 are provided through the arms of the thermostatic member, and there will be no adjustment for delicate accuracy, as in the form of thermostatic member shown in Fig. 6.

The flow of gas past piston 66 and through corresponding passageway 67 to discharge members 68 and 69 comprises a flow meter of well-known construction. The piston 66 is connected with a stem 121 which operates within the bore 122 of a glass tubing 123. The tubing 123, as clearly shown in Fig. 1, is positioned adjacent a scale 124 which may be formed on a removable plate 125 of paper or other desired material. The end of the stem 121, showing within tube 123, will indicate upon scale 124 the rate of flow of gas per minute in a desired measurement, as, for example, liters per minute. By operating the thumbscrew 91, and observing the position of the end of stem 121 in reference to scale 124, the pilot or other operator can adjust and determine at all times the flow of gas going through delivery tube 69 to pilots and passengers.

The pressure of gas coming from the source of supply into the apparatus is indicated by a customary gauge, shown at 126 in Figs. 1 and 3.

The apparatus will be mounted in any convenient position where accessible by the operator, as indicated in Fig. 1. The mounting may be in the cabin of an airplane, indicated generally at 127, and upon the instrument board therein, indicated at 128, by means of, for example, a post 129 which may be threaded into the casting 10 of the regulator, as indicated at 130.

The advantages of my invention and its mode of operation have been pointed out quite fully in the foregoing specification. The primary advantages are that means are provided for varying supply of oxygen in inverse ratio of density of air being breathed, which is the same as in direct ratio to difference in elevation, unaffected by changes of temperature. The effect of temperature changes upon the pressurestat for controlling flow of oxygen is compensated by the bimetallic thermostat member subject to such changes of temperature.

I claim:

1. A gas delivery regulator including a valve, a diaphragm connected with the valve and adapted to close the same by reason of gas pressure upon the diaphragm, a spring exerting compressive force through said diaphragm upon the valve and tending to open it, an expansive pressurestat cooperating with said spring to vary its pressure inversely as external atmospheric pressure varies for controlling the valve to vary flow of gas due to said change of pressure, and means operative upon said pressurestat and said spring automatically to vary the pressure on the spring to compensate for variations of gas flow relative to valve opening due to changes of temperature.

2. A gas delivery regulator including a valve, a diaphragm connected with the valve and adapted to close the same by reason of gas pressure upon the diaphragm, a spring exerting compressive force through said diaphragm upon the valve and tending to open it, an expansive pressurestat cooperating with said spring to vary its pressure inversely as external atmospheric pressure varies for controlling the valve to vary flow of gas due to said change of pressure, a thumb screw acting through said pressurestat for varying the pressure exerted by said spring, and a thermostatic member between said thumb screw and pressurestat adapted automatically to vary the pressure on the spring to compensate for variations of gas flow relative to valve opening due to changes of temperature.

3. A gas delivery regulator including a valve, a diaphragm connected with the valve and adapted to close the same by reason of gas pressure upon the diaphragm, a spring exerting compressive force through said diaphragm upon the valve and tending to open it, an expansive pressurestat cooperating with said spring to vary its pressure inversely as external atmospheric pressure varies for controlling the valve to vary flow of gas due to said change of pressure, and a U-shaped bimetallic thermostatic member having its limbs engaged by said thumb screw and pressurestat respectively with the metal of greatest coefficient of expansion on the outside thereof to vary the pressure on the spring to compensate for the variations of gas flow relative to valve opening due to changes of temperature.

4. A gas delivery regulator including a valve, a diaphragm connected with the valve and adapted to close the same by reason of gas pressure upon the diaphragm, a spring exerting compressive force through said diaphragm upon the valve and tending to open it, an expansive pressurestat cooperating with said spring to vary its pressure inversely as external atmospheric pressure varies for controlling the valve to vary flow of gas due to said change of pressure, a U-shaped bimetallic thermostatic member having its limbs engaged by said thumb screw and pressurestat respectively with the metal of greatest coefficient of expansion on the outside thereof to vary the pressure on the spring to compensate for the variations of gas flow relative to valve opening due to changes of temperature, and means to move said U-shaped thermostatic member longitudinally of its legs to adjust the effective thrust thereof upon the spring due to changes of temperature.

5. A gas delivery regulator comprising a valve controlled by a diaphragm and a spring engageable therewith, an expansible pressurestat, means connecting said pressurestat directly with said spring, and manually controlled means including a thermostatic member outside the pressurestat forming an abutment for receiving the combined force of the thrust of the spring and the pressurestat.

6. A gas delivery regulator comprising a valve controlled by a diaphragm and a spring engageable therewith, a plate provided with a slidable stem engaging said spring, a second plate, a pressurestat having expansible walls contacting the opposed faces of said plates, a thermostatic member supported outside of said second plate, and means holding said thermostatic member for receiving the combined force of the thrust of the spring and the pressurestat.

7. A gas delivery regulator comprising a valve controlled by a diaphragm and a spring engageable therewith, a plate provided with a slidable stem engaging said spring, a second plate, a pressurestat having expansible walls engaging the opposed faces of said plates and holding them spaced one from the other, an abutment mounted for adjusting movement toward or from said plates, and a two-armed thermostatic member having one of its arms contacting the second plate and its other arm contacting the thermostat to receive the combined force of the thrust of the spring and the pressurestat.

8. A gas delivery regulator comprising a valve controlled by a diaphragm and a spring engageable therewith, a plate provided with a slidable stem engaging said spring, a second plate, a pressurestat having expansible walls engaging the opposed faces of said plates and holding them spaced one from the other, an abutment mounted for adjusting movement toward or from said plates, a two-armed thermostatic member having one of its arms contacting the second plate and its other arm contacting the thermostat to receive the combined force of the thrust of the spring and the pressurestat, and means to move the thermostatic member longitudinally of its arms to change the length of throw of said arms effected by given changes of temperature.

JAY A. HEIDBRINK.